C. E. BAUDER.
STEERING GEAR.
APPLICATION FILED JULY 24, 1913.
1,110,103.
Patented Sept. 8, 1914.
2 SHEETS—SHEET 1.
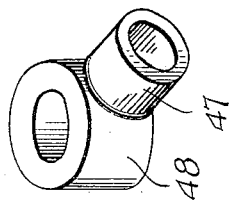
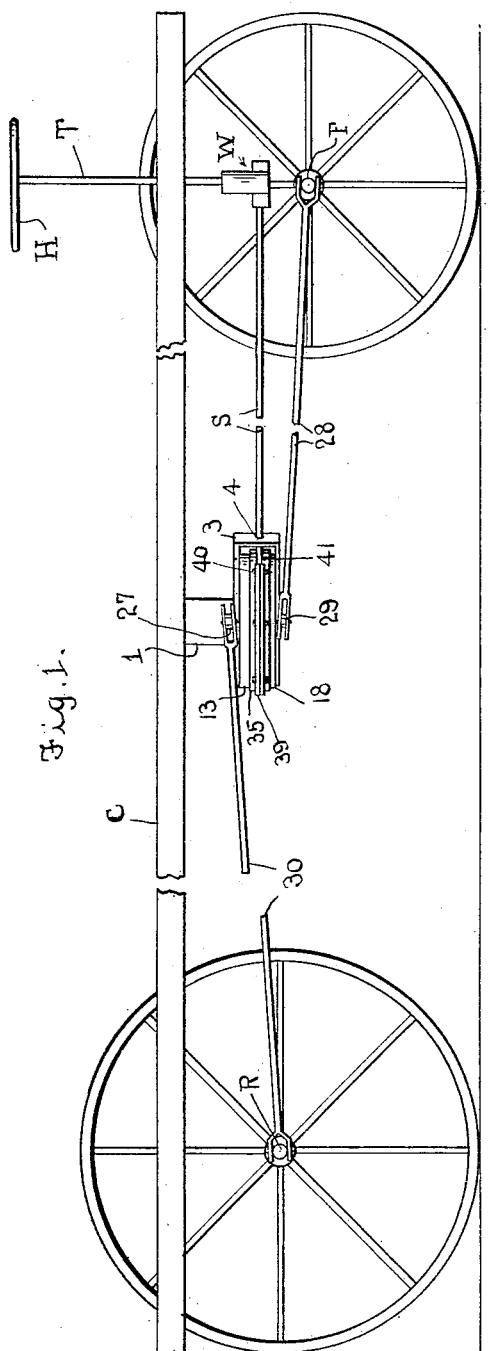
Witnesses
L. B. James
J. Ralph Hoge
Inventor
Charles E. Bauder
By 
Attorneys

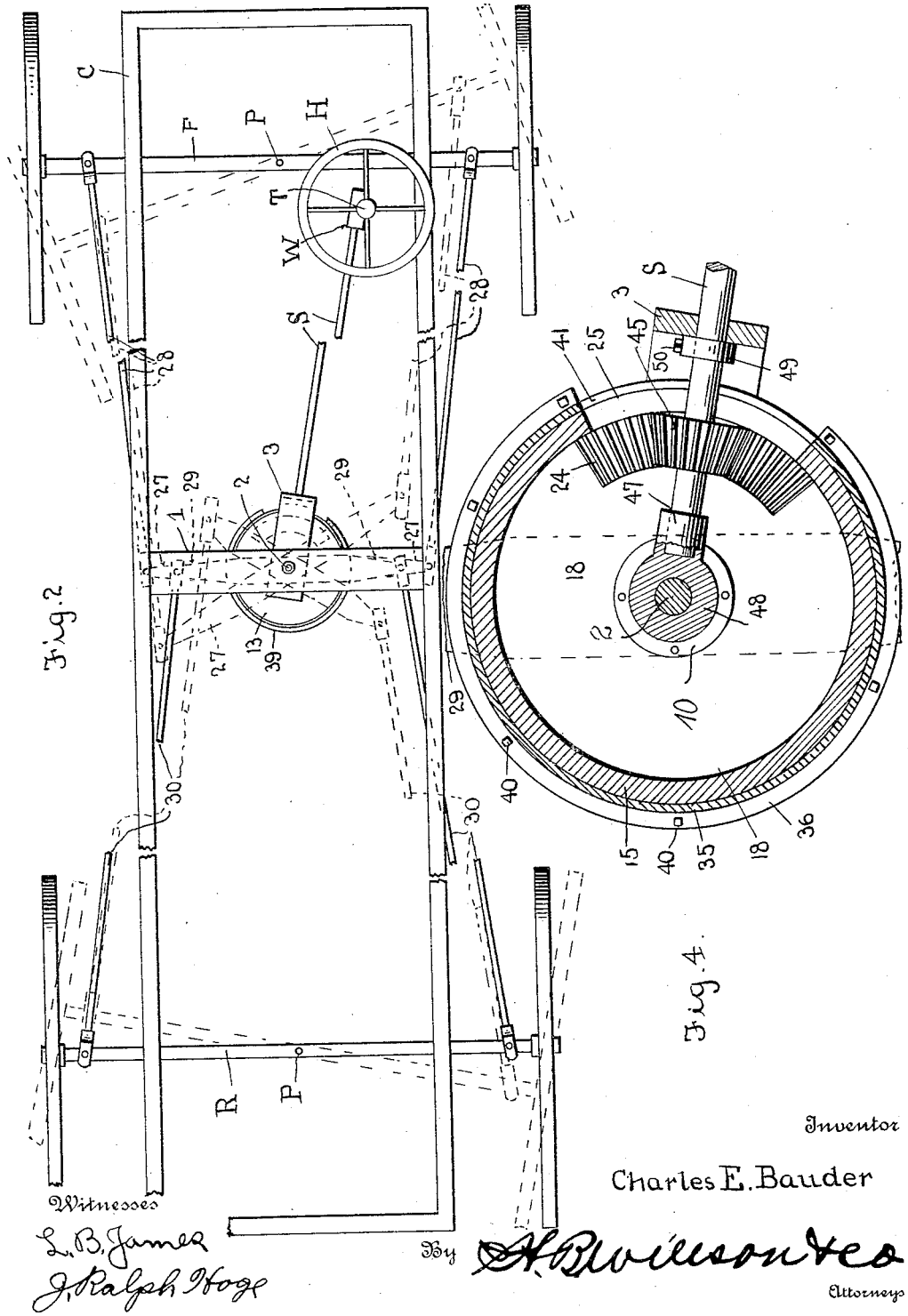

UNITED STATES PATENT OFFICE.

CHARLES E. BAUDER, OF GALETON, PENNSYLVANIA.

STEERING-GEAR.

1,110,103.  Specification of Letters Patent.  Patented Sept. 8, 1914.

Application filed July 24, 1913. Serial No. 781,014.

*To all whom it may concern:*

Be it known that I, CHARLES E. BAUDER, a citizen of the United States, residing at Galeton, in the county of Potter and State of Pennsylvania, have invented certain new and useful Improvements in Steering-Gears; and I do declare the following to be a full, clear, and exact description of the invention, such as will enable others skilled in the art to which it appertains to make and use the same.

This invention relates to motor vehicles, and more especially to the steering gear thereof; and the object of the same is to produce an improved connection between the steering wheel and the shaft of the front axle, rear axle, or both axles of the running gear to which the device is applied. This and other objects are carried out by the construction hereinafter more fully described and claimed, and as shown in the drawings wherein—

Figure 1 is a side elevation and Fig. 2 a plan view of an automobile chassis with my invention applied thereto. Fig. 3 is a considerably enlarged side elevation, partly in section, of the parts of the invention detached from the automobile; and Fig. 4 is a horizontal section on the line 4—4 of Fig. 3; Fig. 5 is a perspective detail of the unbroken sleeve hereinafter referred to.

In the drawings I have illustrated my invention as applied to the running gear or chassis C of an ordinary motor vehicle or truck, whose wheels are mounted on front and rear axles F and R which are both of them pivoted at P below the chassis and which must be moved reversely by short-turning gear in order to steer the machine. The steering is done by a hand wheel H controlling a steering tube T, which latter is connected by a worm mechanism W with the steering shaft S.

No claim is laid on the parts thus far described.

Coming now to the details of the present invention, the numeral 1 designates a beam extending across the chassis and suitably supported thereby, and 2 is a bolt depending from said beam through eyes in the arms of a yoke 3 which is of U-shape, its center having a hole at 4 through which passes the shaft S. The lower arm of the yoke stands above the head of the bolt 2 which head by preference is disposed at the bottom so that the nut of the bolt is at the top of he beam, and by removing this nut the entire mechanism can be disconnected from the chassis. Disposed upon said bolt is a two-part sleeve whose upper member 5 has a flange 6 and above the same a nipple 7, while the lower member 9 has a flange 10 at about its mid-length, and a nipple 11 at its lower end, and its upper end spaced below the lower end of the upper member. The nipples 7 and 11 may be made long enough to extend through the arms of the yoke, although this is not necessary so long as the bolt extends through said arms, but in any event the two members of the sleeve are rotatably mounted on the bolt.

Secured upon or cast integral with the flange 6 of the upper member is a disk 13 having a toothed sector 14 on its lower face, and a depending surrounding flange 15 externally shouldered as at 16 for a purpose to appear below and externally rabbeted at 17 below the shoulder. Secured beneath or cast integral with the flange 10 of the lower sleeve-member is a second disk 18 having around its periphery an upstanding flange 19 of the same size as the flange 15, externally shouldered as at 20, and internally rabbeted as at 21 so that the rabbeted edges of the flanges of the two disks engage each other as seen in Fig. 3. The lower disk also carries a toothed sector 24, and the walls or flanges of both disks are cut away to produce a slot 25 in the drum-shaped structure formed by the two disks when they are applied to each other as shown, this slot receiving the shaft S through the center of its length when the toothed sectors are in register with each other and the two axles stand parallel.

Secured upon the upper disk as by rivets 26 is a cross bar 27 whose extremities are connected by reach rods 28 with the front axle F; and a similar cross bar 29 is secured beneath the lower disk and connected by reach rods 30 with the rear axle R. The arms of the yoke 3 pass next outside the cross bars 27 and 29, and while the nipples 7 and 11 preferably pass through the cross bars, they may terminate there or may pass through the arms of the yoke as above suggested. Instead of rivets 26 to hold said bars on the respective disks, screws or bolts might be used at this point so that the parts could be readily separated. The pivotal connections between the extremities of the reach rods and said bars and the axles may be such as are desired or preferred, but I would make them dust proof as far as possible.

While the yoke is of sufficient stiffness to hold the parts together, I prefer to surround the flanges of the two drums with a two-part ring whereof the upper member 35 has a flange 36 overlying the shoulder 16 on the upper disk, the lower member 37 has a flange 38 underlying the shoulder 20 of the lower disk, and both members have outstanding flanges 39 where they meet, these flanges being connected by bolts 40 so that the parts of this ring can be separated when desired. At a suitable point the ring is provided with a hole 41 through which the shaft S passes, and this hole may also be packed with dust-proof material to prevent any dirt from getting into the interior of the drum. Obviously the passage of the shaft through this ring prevents the latter from turning, or in other words, the ring is carried by the shaft. Although not so illustrated in the drawings, if the ring be employed the yoke might be omitted. The inner end of the shaft carries a bevel pinion 45 meshing with the toothed sectors, and the inner extremity of the shaft may be and by preference is journaled in a bearing 47 which projects radially from an unbroken sleeve 48 (see Fig. 5) journaled on the bolt 2 between the inner ends of the members of the two-part sleeve above referred to, and which members oscillate in opposite directions as steering is effected.

When now the hand wheel is turned, the worm mechanism W causes the shaft S to rotate and this turns the pinion 45 in one direction or the other; the result is that one toothed sector, say 14, is moved to the right while the other sector 24 is moved to the left. This turns the upper disk and its cross bar 27 to the right, and the reach rods 28 cause the front axle to turn in that direction; and simultaneously the lower disk and its cross bar 29 are turned to the left and the reach rods 30 cause the rear axle R to turn in that direction. The result is that the device acts in the nature of a short turning gear, because one axle is turned in one direction and the other in the other. Attention is directed to the fact that the upper cross bar 27 is shown somewhat longer than the lower cross bar, with the result that the front axle may be turned to a greater degree than the rear axle, provided the distance between the pivots of the front reach rods 28 is equal to the distance between the pivots of the rear reach rods 30 where they are connected with their respective axles. The rear reach rods 30 might be disconnected from the lower-most cross bar, in which case the rear axle R would be stationary. It is also quite possible to disconnect the front reach rods and fasten the front axle, and steer the machine from the rear axle only. Wherefore I do not wish to be limited to the short turning arrangement illustrated in the drawing, which results when both sets of reach rods are employed and both disks and their cross bars are brought into action. The parts are entirely of metal, and the proportions and exact details of construction are matters of no moment so long as the principle involved is retained.

I reserve the right to make such changes as come within the spirit of the claims below.

What is claimed as new is:

1. In a steering gear, the combination with a steering mechanism including a pinion; of a pair of superimposed disks mounted on a common pivot and having toothed sectors on their contiguous faces engaging said pinion, cross bars carried by said disks, and reach rods connected with said cross bars and adapted to be connected with the axles of the vehicles.

2. In a steering gear, the combination with a steering mechanism including a pinion; of a pair of superimposed disks mounted on a common pivot supported by the chassis and having inturned peripheral flanges oppositely rabbeted at their meeting edges so as to engage each other, the flanges being cut away at one side to permit the entrance of the steering mechanism, toothed sectors on the contiguous faces of said disks engaging said pinion, cross bars on the upper side of the uppermost disk and the lower side of the lowermost, and reach rods respectively connected with the opposite ends of said bars and adapted to be connected with the front and rear axles.

3. In a steering gear, the combination with a steering mechanism including a pinion; of a pair of superimposed disks mounted on a common pivot supported by the chassis and having inturned peripheral flanges oppositely rabbeted at their meeting edges so as to engage each other, means for holding said edges in sliding engagement, the flanges being cut away to permit the entrance of the steering mechanism, toothed sectors on the contiguous faces of said disks engaging said pinion, and connections between the uppermost disk and one axle and between the lowermost disk and the other axle, for the purpose set forth.

4. In a steering gear, the combination with a steering mechanism including a shaft and a pinion fast thereon; of a pair of superimposed disks mounted on a common pivot supported by the chassis and having peripheral flanges disposed in sliding contact with each other and shouldered on their outer faces, the flanges being cut away to permit the entrance of said shaft, toothed sectors on the contiguous faces of said disks engaging opposite sides of said pinion, connections between the uppermost disk and one axle and the lowermost disk and the other axle of the vehicle, and a ring having inturned flanges at its edges engaging above the shoulder of the uppermost disk and below the shoulder of the lowermost disk, and pierced with a hole for the passage of said shaft.

5. In a steering gear, the combination with a steering mechanism including a shaft and a pinion fast thereon; of a pair of superimposed disks mounted on a common pivot supported by the chassis and having peripheral flanges disposed in sliding contact with each other and shouldered on their outer faces, the flanges being cut away to permit the entrance of said shaft, toothed sectors on the contiguous faces of said disks engaging opposite sides of said pinion, connections between the uppermost disk and one axle and the lowermost disk and the other axle of the vehicle, and a two-part ring whose uppermost member has an inturned flange at its upper edge engaging over the shoulder of the flange of the upper disk and whose lowermost member has an inturned flange at its lower edge engaging beneath the shoulder of the flange of the lower disk, outturned flanges on both members, and means for detachably connecting these flanges, the ring having a hole for the passage of said shaft.

6. In a steering gear, the combination with a steering mechanism including a shaft and a pinion fast thereon; of a pair of superimposed disks mounted on a common pivot supported by the chassis and having peripheral flanges disposed in sliding contact with each other and shouldered on their outer faces, the flanges being cut away to permit the entrance of said shaft, toothed sectors on the contiguous faces of said disks engaging opposite sides of said pinion, connections between the uppermost disk and one axle and the lowermost disk and the other axle of the vehicle, a ring having inturned flanges at its edges engaging above the shoulder of the uppermost disk and below the shoulder of the lowermost disk, and a U-shaped yoke whose arms embrace the disks and have holes receiving said common pivot and whose center has a hole receiving the shaft of said steering mechanism.

7. In a steering gear, the combination with the steering mechanism including a shaft and a pinion at the rear end thereof, and an upright bolt carried by the frame of the vehicle; of a two-part sleeve surrounding said bolt, each member having a radial flange at about its midlength, an upper disk mounted on the flange of the upper member and carrying a toothed sector, a lower disk mounted beneath the flange of the lower member and also carrying a toothed sector, the sectors meshing with said pinion, connections between the upper disk and one axle of the vehicle, and connections between the lower disk and the other axle thereof, for the purpose set forth.

8. In a steering gear, the combination with the steering mechanism including a shaft and a pinion at the rear end thereof, and an upright bolt carried by the frame of the vehicle, of a two-part sleeve surrounding said bolt, the upper member having a radial flange at about its midlength and the lower member having a radial flange at its midlength, an upper disk mounted on the flange of said upper member and carrying a toothed sector, a lower disk mounted beneath the flange of the lower member and also carrying a toothed sector, the sectors meshing with said pinion, connections between the upper disk and one axle of the vehicle, connections between the lower disk and the other axle thereof, inturned peripheral flanges on said disks mounted in sliding contact with each other, the flanges being cut away to produce a slot through which said shaft extends, an unbroken sleeve around said bolt between said members, and a bearing projecting from the last-named sleeve and receiving the inner extremity of said shaft.

9. In a steering gear, the combination with the steering mechanism including a shaft and a pinion at the rear end thereof, and an upright bolt carried by the frame of the vehicle; of a two-part sleeve surrounding said bolt, the upper member having a radial flange at about its midlength and the lower member having a radial flange at about its midlength, an upper disk secured to the flange of said upper member and carrying a toothed sector, a lower disk secured to the flange of the lower member and also carrying a toothed sector, the sectors meshing with said pinion, connections between the upper disk and one axle of the vehicle, connections between the lower disk and the other axle thereof, inturned peripheral flanges on said disks mounted in sliding contact with each other and provided with shoulders on their outer faces, the flanges being cut away to produce a slot through which said shaft extends, and a ring embracing said flanges and having inturned flanges engaging the shoulders thereof, the ring having a hole through which said shaft extends.

10. In a steering gear, the combination with the steering mechanism including a shaft and a pinion thereon, and an upright bolt carried by the frame of the vehicle; of a two-part sleeve surrounding said bolt, an upper disk mounted on the upper member and carrying a toothed sector, a lower disk mounted on the lower member and also carrying a toothed sector, the sectors meshing with said pinion, connections between the upper disk and one axle of the vehicle, connections between the lower disk and the other axle thereof, an unbroken sleeve around said bolt between said members, and a bearing projecting radially from the unbroken sleeve and receiving the inner extremity of said shaft.

11. In a steering gear, the combination with the steering mechanism including a shaft and a pinion at the rear end thereof, and an upright bolt carried by the frame of the vehicle; of a two-part sleeve surrounding said bolt, an upper disk mounted on the upper member and carrying a toothed sector, a lower disk mounted on the lower member and also carrying a toothed sector, the sectors meshing with said pinion, connection between the upper disk and one axle of the vehicle, connections between the lower disk and the other axle thereof, inturned peripheral flanges on said disks mounted in sliding contact with each other, the flanges being cut away to produce a slot through which said shaft extends, an unbroken sleeve around said bolt between said members, and a bearing projecting from the last-named sleeve and receiving the inner extremity of said shaft.

In testimony whereof I have hereunto set my hand in presence of two subscribing witnesses.

CHARLES E. BAUDER.

Witnesses:
 JAMES FISH,
 R. B. WOOD.

---

Copies of this patent may be obtained for five cents each, by addressing the "Commissioner of Patents, Washington, D. C."